(12) United States Patent
Toyama et al.

(10) Patent No.: US 7,083,097 B2
(45) Date of Patent: Aug. 1, 2006

(54) OPTICAL INFORMATION READING APPARATUS

(75) Inventors: Hiroshi Toyama, Chita (JP); Tadao Ooshima, Nagoya (JP); Makoto Ito, Kariya (JP)

(73) Assignees: Denso Wave Incorporated, Tokyo (JP); Denso Elecs Co., Ltd., Kariya (JP)

( * ) Notice: Subject to any disclaimer, the term of this patent is extended or adjusted under 35 U.S.C. 154(b) by 118 days.

(21) Appl. No.: 10/786,093

(22) Filed: Feb. 26, 2004

(65) Prior Publication Data

US 2004/0173681 A1 Sep. 9, 2004

(30) Foreign Application Priority Data

Mar. 3, 2003 (JP) ............................. 2003-055750

(51) Int. Cl.
*G06K 7/10* (2006.01)

(52) U.S. Cl. ............. 235/454; 235/462.42; 235/472.01

(58) Field of Classification Search ........... 235/462.41, 235/462.42, 462.35, 455
See application file for complete search history.

(56) References Cited

U.S. PATENT DOCUMENTS 5,280,161 A * 1/1994 Niwa ..................... 235/462.42
5,949,057 A * 9/1999 Feng ..................... 235/472.01
6,164,544 A * 12/2000 Schwartz et al. ...... 235/462.43
6,212,012 B1 4/2001 Tanaka
6,560,024 B1 5/2003 Akiyama et al.
6,601,768 B1 * 8/2003 McCall et al. ......... 235/462.42
6,820,810 B1 * 11/2004 Vinogradov et al. ........ 235/454
6,866,198 B1 * 3/2005 Patel et al. ............ 235/472.01
2003/0038179 A1 2/2003 Tsikos

FOREIGN PATENT DOCUMENTS

JP        A-2000-241755    9/2000
JP           2002-55060    2/2002

* cited by examiner

*Primary Examiner*—Seung H Lee
(74) *Attorney, Agent, or Firm*—Posz Law Group, PLC

(57) ABSTRACT

The present invention provides an optical information reading apparatus capable of producing uniform and bright illumination light and of projecting the illumination light onto an appropriate position on an object of reading at all times. In the apparatus, a light-receiving optical system including a light-receiving sensor and an image formation lens is provided and illumination optical systems each including an LED and an illumination lens device are placed on both sides of the image formation lens. The illumination optical systems are integrally connected to each other through a connecting portion to form a lens-connected assembly. In an incident surface of the illumination lens device, a plurality of convex lens tiers and a plurality of concave lens tiers are alternately made smoothly to form a multi-tiered lens surface, and an output surface thereof is made into a gentle cylindrical configuration to form a rod-like lens surface.

8 Claims, 7 Drawing Sheets

OPTICAL INFORMATION READING APPARATUS

BACKGROUND OF THE INVENTION

1) Field of the Invention

The present invention relates to an optical information reading apparatus designed to read information codes such as bar codes.

2) Description of the Related Art

This type of conventional optical information reading apparatus (bar code reader) is made by accommodating, in a case, an illumination optical system including a plurality of LEDs and illumination lenses located in front thereof, and a light-receiving optical system including image formation lenses and light receiving sensors. The illumination optical system emits illumination light with a horizontally elongated configuration through a read opening onto an object of reading (object to be read) such as bar-code printed paper (label), and the light-receiving optical system receives the reflected light from the object of reading to read the bar codes.

In this case, so far, as the illumination lens there has commonly been employed a semicylindrical lens having an output portion formed into a cylindrical plane. On the other hand, in an appearance inspection apparatus equipped with a line sensor, it is considered to uniform the illumination light through the employment of a lenticular lens as the illumination lens (for example, Japanese Patent Laid-Open 2002-55060).

Figure 11A:
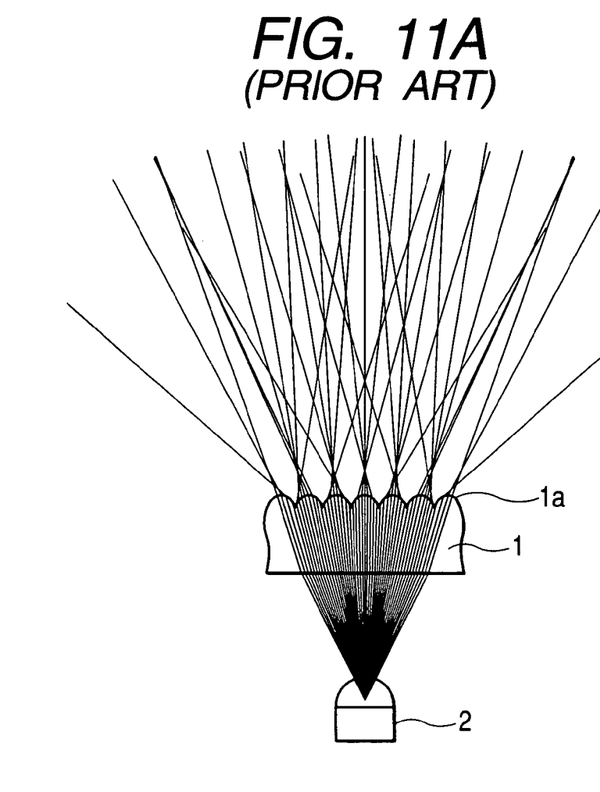
FIGS. 11A and 11B are enlarged plan views showing a configuration of a multi-tiered lens unit surface of an illumination lens device of a conventional optical system.
Figure 11B:
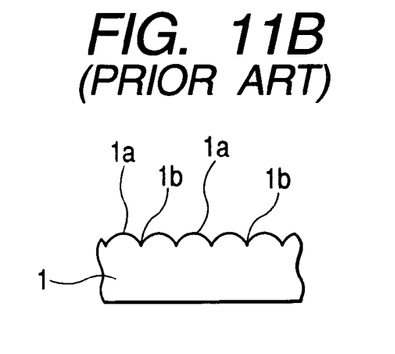

For example, as FIGS. 11A and 11B shows, a lenticular lens 1 mentioned above has, at its output plane side, a large number of convex lenses 1a formed into a continuous tier configuration so that incident light from an LED 2 emerges in a state diffused in horizontal directions (read width directions). However, this lenticular lens 1 has inflection points 1b between convex lens tiers 1a, and light does not emerge at the inflection point 1b portions, which creates a problem in that the uselessness occurs in light quantity and difficulty is experienced in uniforming the illumination light.

In addition, in the case of the appearance inspection apparatus disclosed in the aforesaid patent document, the distance between the illumination optical system and the object is made constant and, hence, there is no need to take the difference between the illumination optical axis and the image formation optical axis into consideration. On the other hand, in the case of a bar-code reader in which the distance between an illumination optical system and an object of reading can vary, there is a need to project the illumination light properly (without shifting vertically) onto a read position over the entire read depth range. This requires reducing the difference between the illumination optical axis and the image formation optical axis to the utmost.

SUMMARY OF THE INVENTION

The present invention has been developed in consideration of these situations, and it is therefore an object of the invention to provide an optical information reading apparatus capable of obtaining uniform and bright illumination light and of projecting the illumination light onto an appropriate position of an object of reading at all times irrespective of a variation of the distance between the object of reading and an illumination optical system.

For this purpose, an optical information reading apparatus according to an aspect of the present invention comprises illumination lens means of an illumination optical system including a multi-tiered lens unit (section) in which a plurality of concave lens tiers and a plurality of convex lens tiers are alternately disposed in succession along read width directions and a rod-like (long cylindrical) lens unit (section) for condensing the illumination light in a direction perpendicular to the read width directions, with the multi-tiered lens unit and the rod-like lens unit being integrated with each other.

With this construction, in the illumination lens means, the multi-tiered lens unit can diffuse (spread) the light from an illumination light source uniformly in the read width directions and the rod-like lens unit can provide the illumination light which does not diffuse in directions perpendicular to the read width directions. At this time, since the multi-tiered lens unit includes the plurality of concave lens tiers and the plurality of convex lens tiers which are alternately disposed in succession, all the lights from the illumination light source can pass therethrough, which provides bright illumination light efficiently without waste. Moreover, since the illumination lens means is constructed in a state the multi-tiered lens unit and the rod-like lens unit are integrated with each other, the simplification of the construction is achievable as compared with separate construction, which contributes to the size reduction and weight reduction of the entire apparatus.

In this construction, when the optical axis of the illumination light and the optical axis of the light-receiving optical system are optically disposed on the same plane, the illumination light can be projected to an appropriate read position at all times regardless of the distance between an object of reading and the illumination optical system.

Meanwhile, the trend of the light reception in this type of optical information reading apparatus is that, due to the characteristic of the light-receiving optical system (image formation lens), a peripheral (fringe) portion in the read width directions becomes darker as compared with a central side portion (portion close to the center). Therefore, the illumination lens means is arranged such that the peripheral portion and central side portion in the read width direction differ in optical characteristic from each other so that the peripheral portion has a light diffusion range smaller than that of the central side portion. This makes the degree of condensing of the illumination light in the peripheral portion larger to compensate for the darkened peripheral portion stemming from the characteristic of the light-receiving optical system, thus enhancing the readability.

More concretely, in the case of the aforesaid multi-tiered lens unit, the divergence varies with the difference in radius of curvature and, hence, when the multi-tiered lens unit is made such that its peripheral portion and its central side portion have different radii of curvature, the peripheral portion can be made to have a smaller diffusion range than that of the central side portion. Alternatively, when the rod-like lens unit is formed to have a curved surface also in the read width directions, the peripheral portion can be made to have a smaller diffusion range than that of the central side portion. In either case, the optical characteristic can be set to vary between the peripheral portion and the central side portion.

In addition, for indicating a read position, a guide optical system can be provided which includes a guide light source for emitting laser light and a guide lens for spreading the light emitted from the guide light source in the read width directions, and in the case of the employment of this guide optical system, the guide lens can be formed integrally with the illumination lens means. This simplifies the apparatus construction.

Still additionally, in a case in which two illumination optical systems each corresponding to the aforesaid illumination optical system are disposed symmetrically with respect to the light-receiving optical system, and the illumination lens means of the symmetrically disposed illumination optical systems are integrally connected to each other through a connection portion which does not function as a lens. Thus, because of the integration of the right- and left-side illumination lens means, the reduction of the number of parts and the improvement of the assembling performance are achievable.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Embodiments of the present invention will be described hereinbelow with reference to the drawings.

(First Embodiment)

Referring to FIGS. 1A to 7, a description will be given hereinbelow of a first embodiment of the present invention. In this embodiment, the present invention is applied to a handy-type bar-code reader acting as an optical information reading apparatus.

Figure 1A:
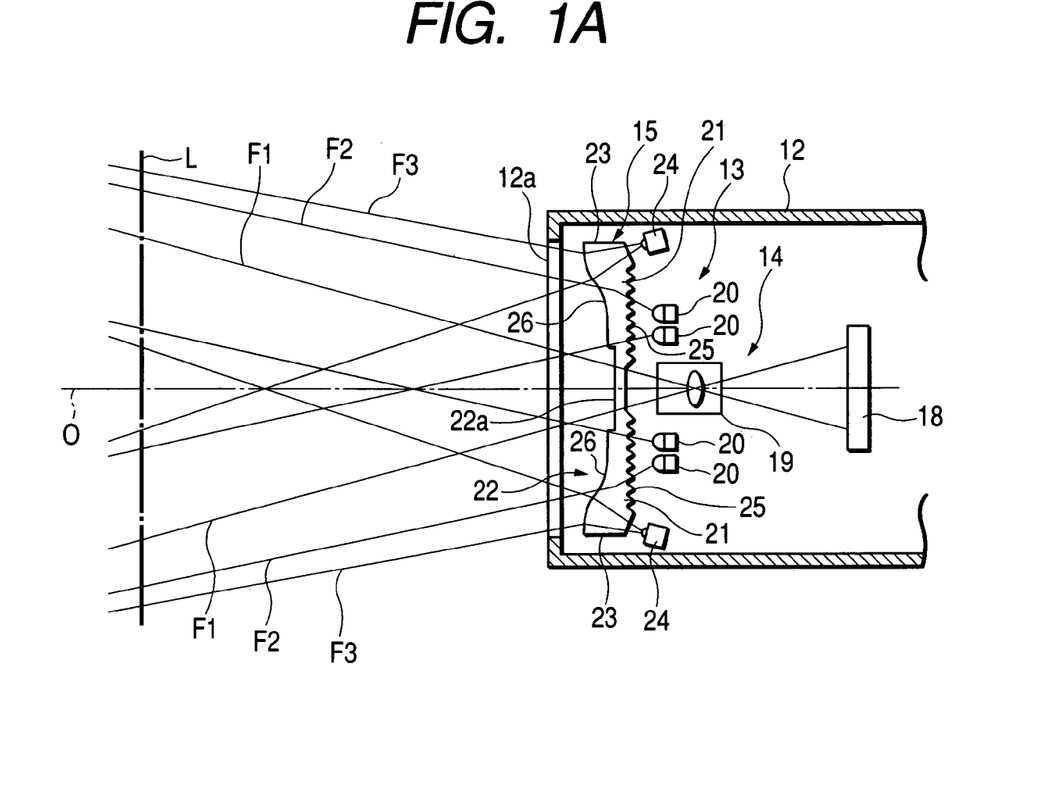
FIG. 1A is a horizontal plan view showing a configuration of an optical system of a bar-code reader according to a first embodiment of the present invention.
Figure 1B:
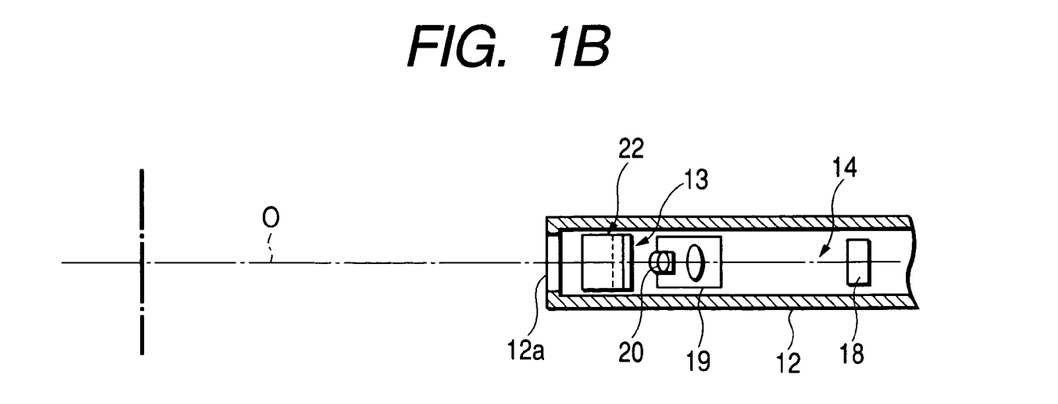
FIG. 1B is a vertical cross-sectional side-elevational view showing the same bar-code reader optical system.
Figure 7:
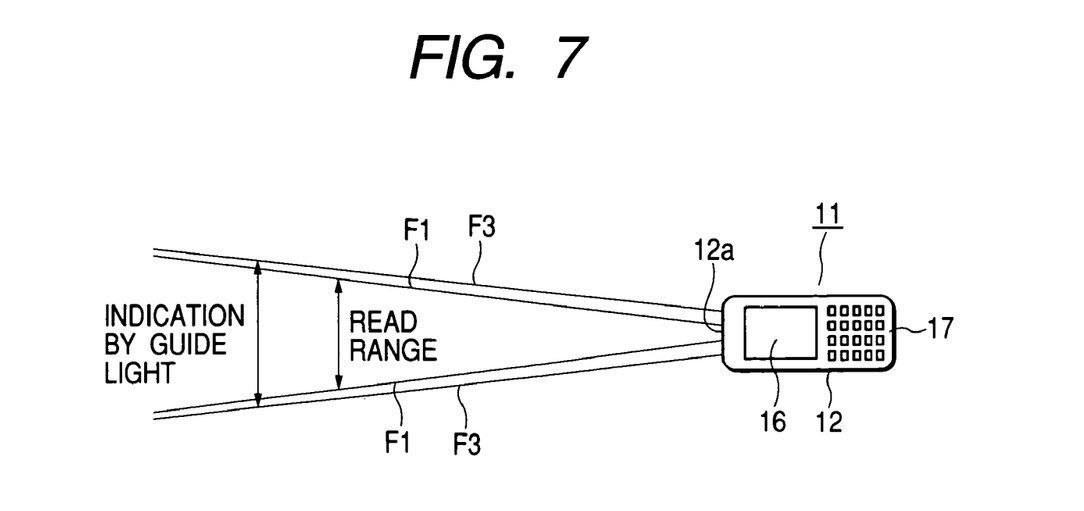
FIG. 7 is a plan view showing a read range of the bar-code reader and an indication range of guide light according to this embodiment.

A bar-code reader 11 serving as an optical information reading apparatus according to this embodiment is accommodated in a tip side of a vertically elongated case 12 with a size allowing it to be held and manipulated by one hand of a user as shown partially in FIG. 7 and, as shown in FIGS. 1A and 1B, is made up of an illumination optical system 13 forming an illumination means for reading a bar code recorded on an object L of reading such as a label (not shown), a light-receiving optical system 14 forming a light-receiving means and a guide optical system 15 forming a guide light illumination means. In a tip surface of this case 12, there is formed a read window (read opening) 12a having a horizontally elongated rectangular configuration and having a translucency.

Moreover, as shown in FIG. 7, a display unit 16 and key operation unit 17 are provided on an upper surface portion of the case 12 and, although not shown, a trigger switch to be pressing-operated, for example, in two stages is provided on a side surface portion of the case 12. Still moreover, although not shown, the case 12 accommodates a control circuit for implementing control as a whole and for conducting decode processing or the like on the bar code read, a communication circuit for making a communication with the external, a secondary battery serving as a drive power source, and others.

A description will be given hereinbelow of each of the optical systems 13, 14 and 15.

First, as shown in FIGS. 1A and 1B, the aforesaid light-receiving optical system 14 is composed of a light-receiving sensor 18, for example, a CCD area sensor, having a horizontally elongated configuration and disposed at a central portion in the case 12 and an image formation lens 19 placed in front of the light-receiving sensor 18. In this configuration, the read optical axis 0 of the image formation lens extends through the center of the read window 12a in a state perpendicular to a surface of the read window 12a. Moreover, a field of view (read range) F1 (its outer edges are indicated by thin lines) of the light-receiving optical system 14 is set to be somewhat smaller than the size of the read window 12a. Although the detailed illustration and description will be omitted, the image formation lens 19 is constructed in a state where a plurality of lenses are disposed in a lens-barrel.

Two illumination optical systems 13 (the aforesaid illumination optical system 13) are symmetrically disposed with respect to the image formation lens 19, and each of the illumination optical systems 13 includes a plurality of (two in FIG. 1A) LEDs 20 each serving as an illumination light source and an illumination lens device (illumination lens means) having a horizontally elongated configuration and placed in front of the LEDs 20. In this embodiment, the right- and left-side illumination lens devices 21, 21 are integrally connected to each other at a connecting portion 22a which lies at a central portion and which does not function as a lens, thus providing a lens-connected assembly 22. Moreover, this lens-connected assembly 22 integrally has guide lens portions 23, 23 at its right- and left-side end portions. The configuration of each of the illumination lens devices 21 will be described in detail afterwards.

Accordingly, in the illumination optical system 13, the light emitted from the LEDs 20 is condensed and diffused by the illumination lens devices 21 to be spread in horizontal directions (in read width directions) and is outputted as a narrow band-like illumination light in vertical directions so that the illumination light is emitted forwardly (directed at the object L of reading through the read window 12a. At this time, the illumination optical axis of the illumination light outputted from the right- and left-side illumination lens devices 21 is positioned in the optically same plane as the optical plane including the read optical axis 0 of the image formation lens 19 and the light-receiving sensor 18. Moreover, as indicated by thin lines (outer edges) F2 in FIG. 1, the horizontal illumination range of the illumination light is made to be somewhat wider than the field of view F1 of the light-receiving optical system.

Figure 6:
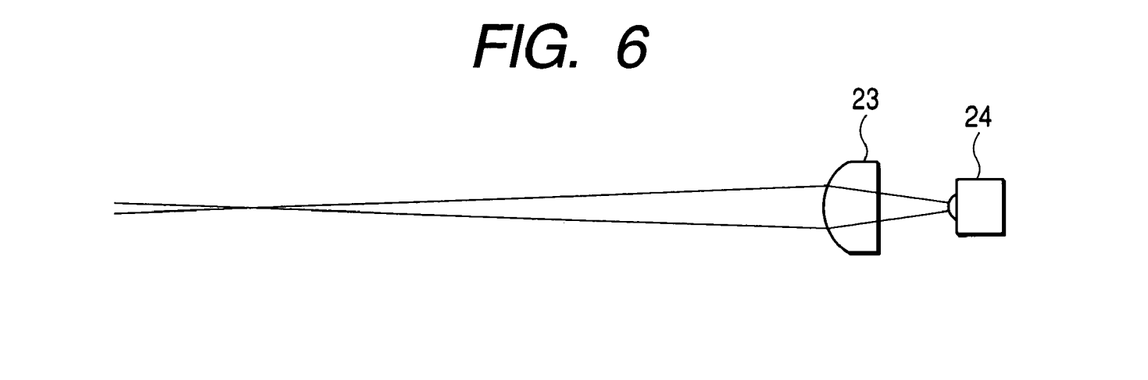
FIG. 6 is a side-elevational view showing a construction of a guide optical system according to this embodiment.

In addition, a pair of guide optical systems 15 (the aforesaid guide optical system 15) are positioned more outwardly with respect to the illumination optical systems 13 and, also as shown in FIG. 6, each of the guide optical systems 15 includes a guide light source 24 made with a semiconductor laser or the like for emitting a red laser light beam and a guide lens (23) disposed in front of the guide light source 24. In this case, the guide lens is integrally attached as a guide lens portion 23 to one of outer end portions of the lens-connected assembly 22 (illumination lens devices 21).

This guide lens portion 23 fulfills a function to diffuse the laser light from the guide light source 24 in horizontal directions (see FIG. 1A) and to condense it in vertical directions (see FIG. 6) for outputting as guide light. At this time, with respect to the vertical directions, the focal point is made in the vicinity of a read reference distance. Moreover, the horizontal guide light illumination range is made to be somewhat larger than the field of view F1 of the light-receiving optical system 14 and the illumination range F2 of the illumination light as indicated as outer edges by thin lines F3 in FIGS. 1A and 7. Accordingly, the guide optical systems 15 project horizontally elongated guide light forwardly (toward the object L of reading) through the read window 12a.

With the above-described construction, when a user directs the read window 12a of the case 12 toward the object L of reading, on which a horizontally elongated bar code is recorded, in substantially parallel therewith and turns on a trigger switch up to a first stage (so-called half-pressing) in a state brought close approximately to the read reference distance, each of the guide optical systems 15 emits a horizontally elongated band-like guide light beam (red light) through the read window 12a toward the object L of reading.

At this time, the user aligns the case 12 so that, for example, the guide light beam intersects a central portion of the bar code and then turns on the trigger switch up to a second stage. In response to this, the guide light is put out and a horizontally elongated band-like illumination light is then emitted from the illumination optical system 13 through the read window 12a to be put on the bar code and the reflected light from the bar code is incident through the read window 12a so that an image is formed through the image formation lens 19 on the light-receiving sensor 18, thereby reading the bar code.

Furthermore, referring to FIGS. 1A to 5, a detailed description will be given hereinbelow of the aforesaid illumination lens devices 21. Each of the illumination lens devices 21 is made of, for example, a synthetic resin and is formed into a horizontally elongated rod-like configuration as a whole. It is composed of a multi-tiered lens unit (section) formed by arranging a plurality of concave lens tiers and convex lens tiers alternately and continuously in the read width directions and a rod-like lens unit (section) for condensing the illumination light in a direction perpendicular to the read width directions, with the multi-tiered lens unit and the rod-like lens unit being constructed integrally with each other.

Figure 2A:
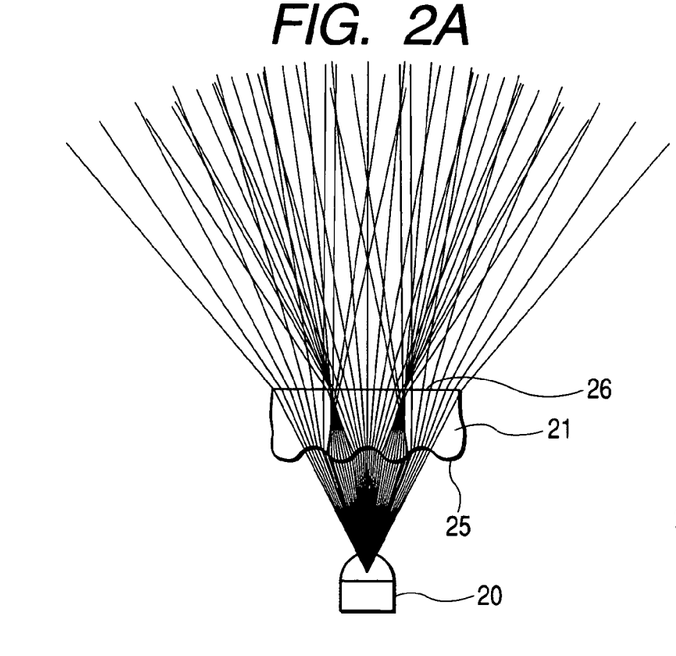
FIGS. 2A sand 2B are enlarged plan views showing a configuration of a multi-tiered lens unit surface of an illumination lens device of the optical system according to this embodiment.
Figure 2B:
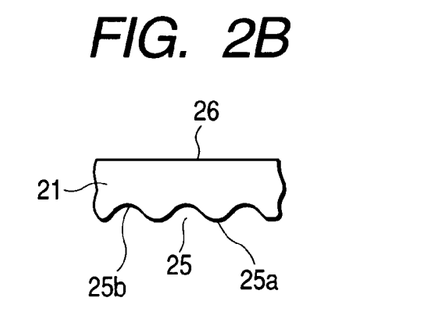
Figure 3:
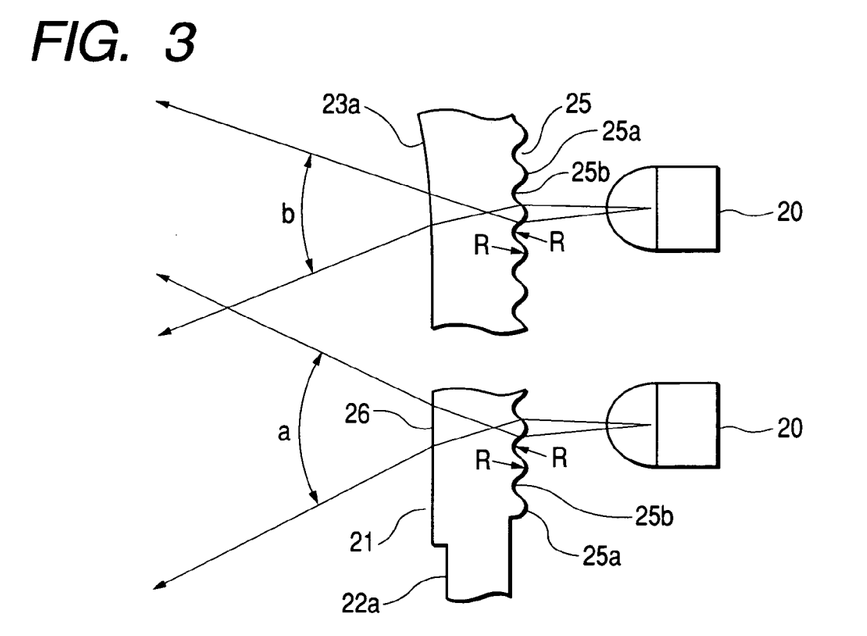
FIG. 3 is a plan view showing a construction of the illumination optical system of the optical system according to this embodiment.

Concretely, as shown in FIGS. 2A, 2B and 3, an incident surface portion (LED 20 side surface) of the illumination lens device 21 is made as a multi-tiered lens unit surface in which a plurality of convex lens tiers 25a and a plurality of concave lens tiers 25b, which extend in vertical directions, are alternately formed in horizontal directions. At this time, both the convex lens tiers 25a and concave lens tiers 25b are bent into an arc-like configuration as a whole so that they show a smoothly continuous configuration and, when viewed from the above, they shows a so-called wave-like configuration. Moreover, in this case, the radii R of curvature of the convex lens tiers 25a and concave lens tiers 25b are all equivalent to each other as a whole.

Figure 4:
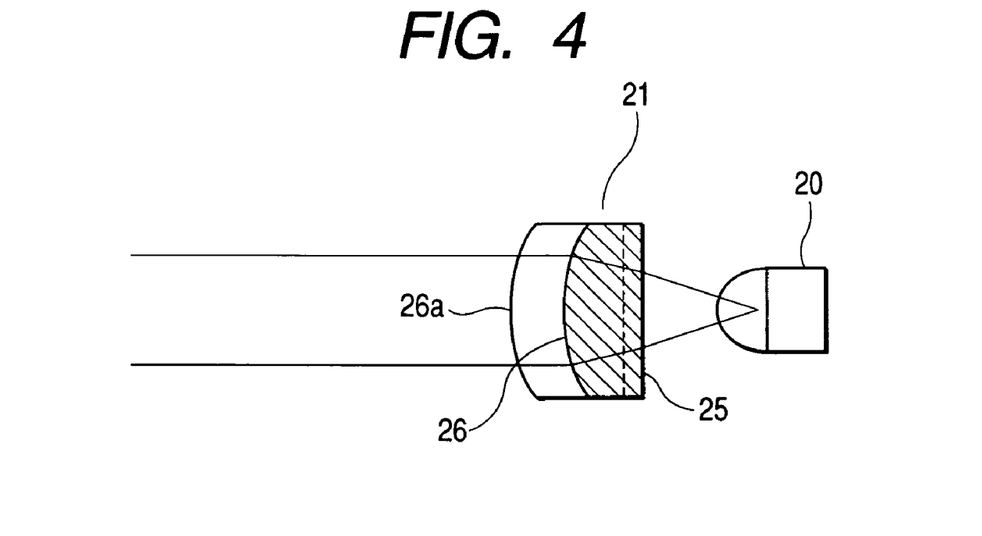
FIG. 4 is a vertical cross-sectional side-elevational view showing the construction of the illumination optical system of the optical system according to this embodiment.
Figure 5:
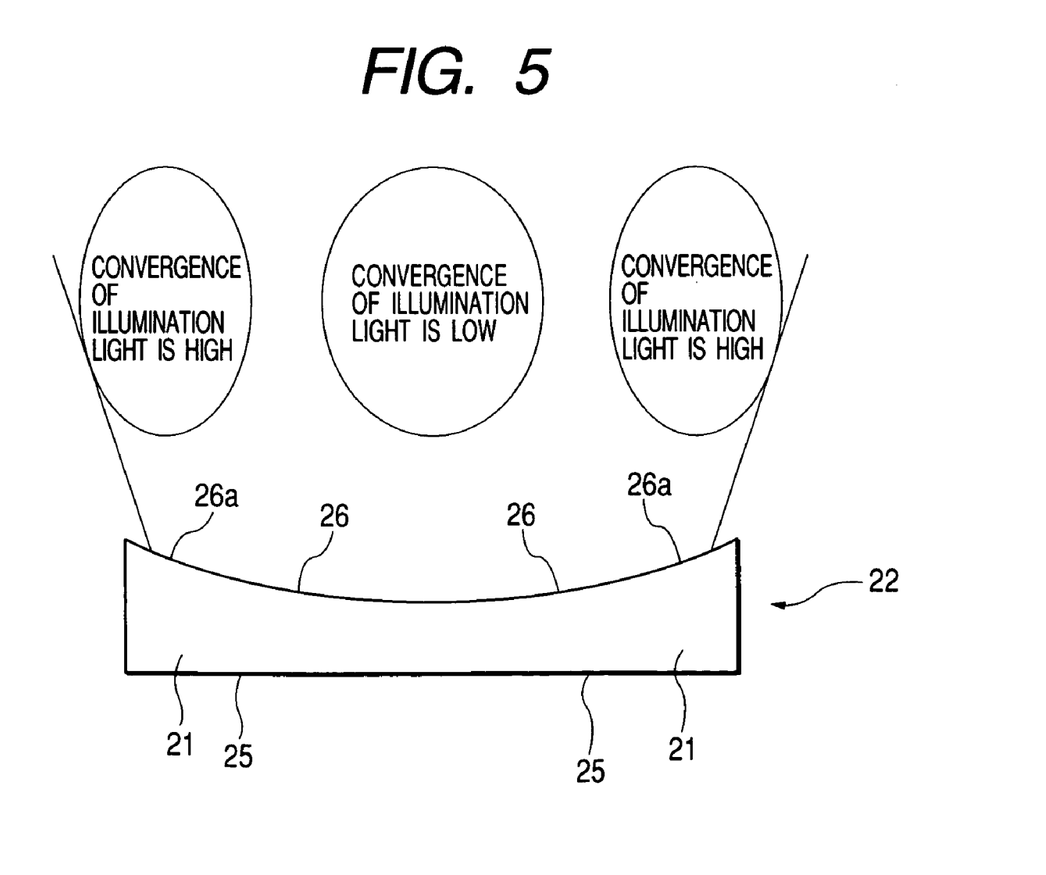
FIG. 5 is an illustration of the relationship between a configuration of a rod-like lens unit surface and an intensity of illumination light.

On the other hand, as shown in FIG. 4, an output surface of the illumination lens device 21 is formed into a rod-like lens surface 26 having a gentle cylindrical configuration with respect to a horizontal axis. Moreover, in this embodiment, also as shown in FIGS. 3 and 5, the rod-like lens surface 26 is made such that its central side portion (inner portion) in the read width direction is formed to have a constant lens thickness while its peripheral portion (outer portion) is formed as a gently curved surface portion 26a (concave surface when viewed from the above) in which the lens thickness increases gradually when viewed from the above. Accordingly, the central side portion and the peripheral portion have optical characteristics different from each other.

Secondly, a description will be given hereinbelow of an operation of the above-described construction. In the illumination optical system 13 thus constructed, the light from the LED 20 is incident on a multi-tiered lens unit surface 25 of the illumination lens device 21 is diffused in horizontal directions and is condensed (collected) in vertical directions by the rod-like lens unit surface 26, thereby outputting a horizontally elongated uniform illumination light beam as a whole. At this time, since the multi-tiered lens unit surface 25 has a plurality of convex lens tiers 25a and a plurality of lens tiers 25b which are alternately arranged in a smoothly continuing state, unlike a conventional lenticular lens 1 having a bent lens surface, the multi-tiered lens unit surface 25 allows the transmission of all the light from the LED 20, thus providing bright illumination light efficiently without waste.

In addition, although this type of bar-code reader 11 can cause the distance between the read window 12a (illumination optical system 13) of the case 12 and the object L of reading to vary, since the optical axis of the illumination light and the optical axis O of the light-receiving optical system 14 are placed on the optically same plane, the illumination light can always be projected to an appropriate read position irrespective of the distance between the object L of reading and the illumination optical system 13 in a state where the illumination light is not shifted in vertical directions over the entire read depth range.

Meanwhile, in the above-described construction, in reading a bar code, the trend of the light reception is that, due to the characteristic of the image formation lens 19 in the light-receiving optical system 14, a peripheral (fringe) portion in the read width directions becomes darker as compared with a central side portion (portion close to the center). However, in this embodiment, since the curved surface portion 26a is formed in the peripheral side of the rod-like lens unit surface 26 of the illumination lens device 21, as shown in FIG. 3, an light diffusion range b in a peripheral portion becomes narrower than a light diffusion range a in a central side portion, and as shown in FIG. 5, the degree of convergence (condensing) of the illumination light increases more in a peripheral portion side of the bar code. In consequence, it is possible to compensate for the fact that the peripheral portion becomes dark due to the characteristic of the light-receiving optical system 14, thereby enhancing the readability.

Moreover, the illumination lens device 21 includes the multi-tiered lens unit surface 25 and the rod-like lens unit surface 26 in a state where they are integrated with each other, and as compared with a case in which they are separately provided (using two lenses), the simplification of the structure becomes feasible, which leads to achieving the size and weight reductions of the entire apparatus. Still moreover, since the right- and left-side illumination lens units 21, 21 are constructed in the form of a lens-connected assembly 22 in which they are integrally connected to each other through the connecting portion 22a which does not function as a lens and the guide lens portions 23, 23 constituting the guide optical systems 15 are also integrated with the lens-connected assembly 22, a further structure simplification becomes feasible, thereby reducing the number of parts and improving the assembling performance.

Thus, according to this embodiment, since each of the illumination lens devices 21 of the illumination optical system 13 is made in a state where the multi-tiered lens unit surface 25 and the rod-like lens unit surface are integrated with each other and the optical axis of the illumination light is placed in the optically same plane as that of the optical axis 0 of the light-receiving optical system 13, uniform and bright illumination light attainable and, regardless of a variation of distance between the object L of reading and the illumination optical system 13, the illumination light is put at an appropriate position of the object L of reading at all times, which offers excellent effects.

Figure 8:
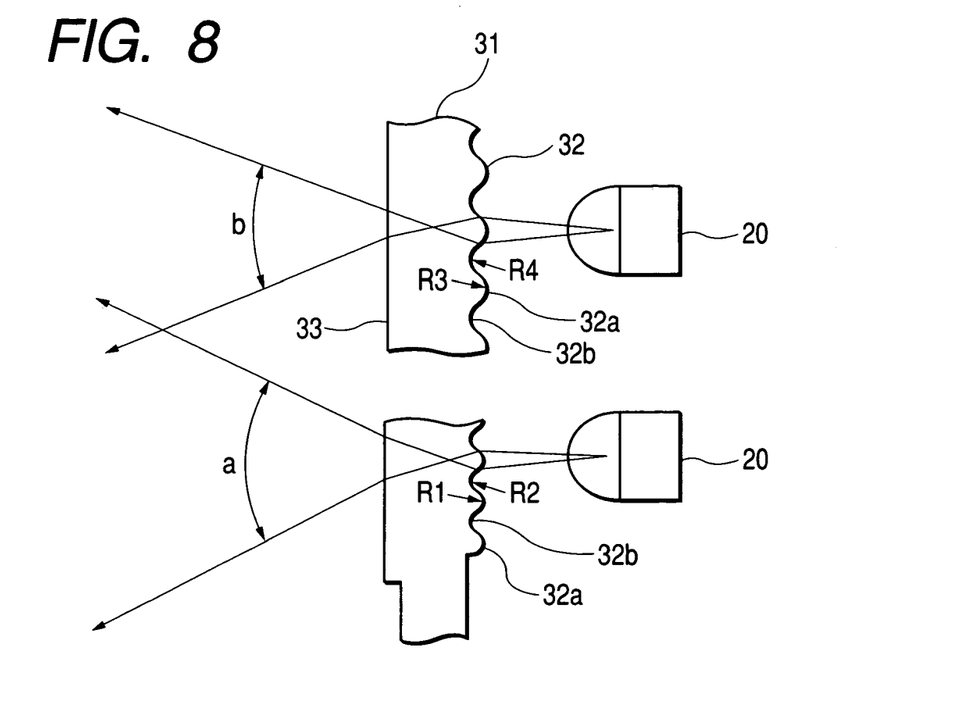
FIG. 8 is a plan view showing a construction of an illumination optical system of an optical system according to a second embodiment of the present invention.

FIG. 8 shows a second embodiment of the present invention. A difference from the above-described first embodiment is a construction of an illumination lens device(s) 31. That is, in this illumination lens device 31, its incident surface portion is made as a multi-tiered lens unit surface 32 in which a plurality of convex lens tiers 32a and a plurality of concave lens tiers 32b, which extend in vertical directions, are alternately formed in horizontal directions and its output surface portion is made as a rod-like lens unit surface 33 having a gentle cylindrical surface configuration with respect to a horizontal axis.

In this construction, the rod-like lens unit surface 33 is formed to have a uniform configuration (thickness) in the horizontal directions, and the radii of curvature of the convex lens tiers 32a and the concave lens tiers 22b in the multi-tiered lens unit surface 32 stand at different values at the peripheral portion and the central side portion. Concretely, the radii of curvature R3 and R4 at the peripheral portion are set to be larger than the radii of curvature R1 and R2 at the central side portion. This causes the peripheral portion and the central side portion in the illumination lens device 31 to have different optical characteristics and, hence, the light diffusion range b of the peripheral portion becomes smaller than the light diffusion range a of the central side portion so that the degree of convergence of the illumination light in a peripheral portion side of a bar code more increases, which offers the effects similar to those of the above-described first embodiment.

Figure 9:
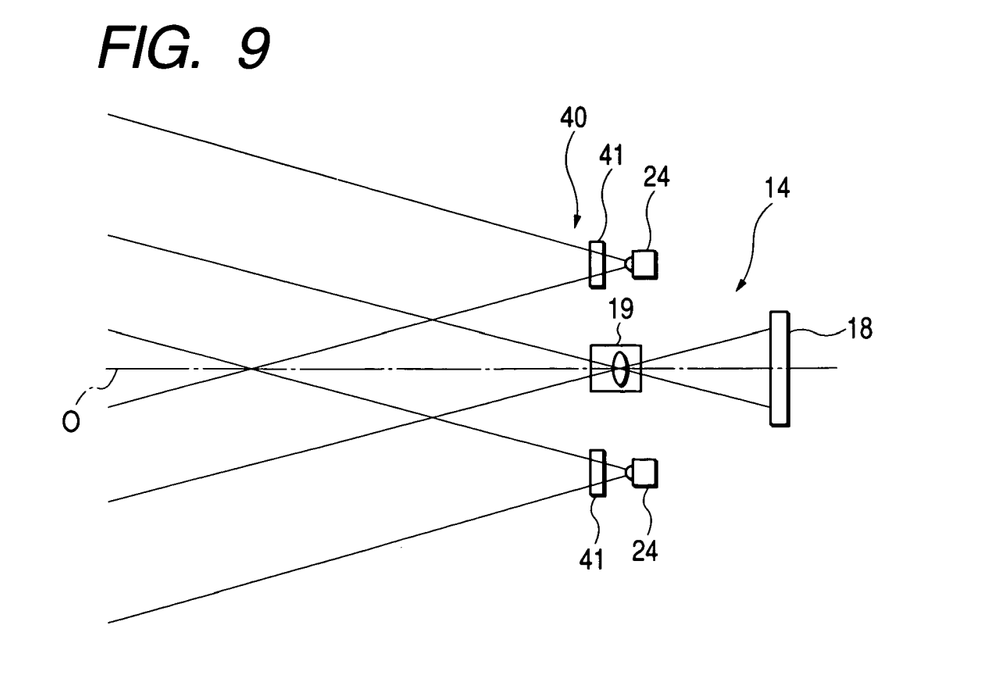
FIG. 9 is a plan view showing an optical system according to a third embodiment of the present invention.

FIG. 9 shows a third embodiment of the present invention. In this embodiment, a guide optical system 40 is made up of guide light sources 24 and guide lenses 41 located in front thereof and disposed separately from the illumination lens device (the illumination optical system is omitted from the illustration). This guide optical system 40 can be used when needed.

Figure 10A:
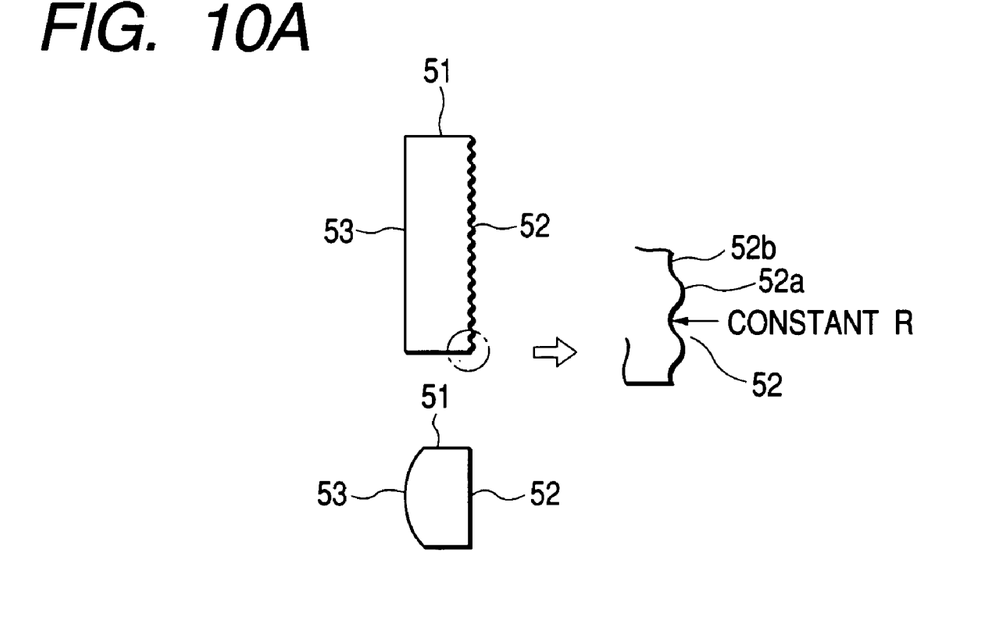
FIG. 10A is an illustration of a configuration of an illumination lens device according to a fourth embodiment of the present invention.
Figure 10B:
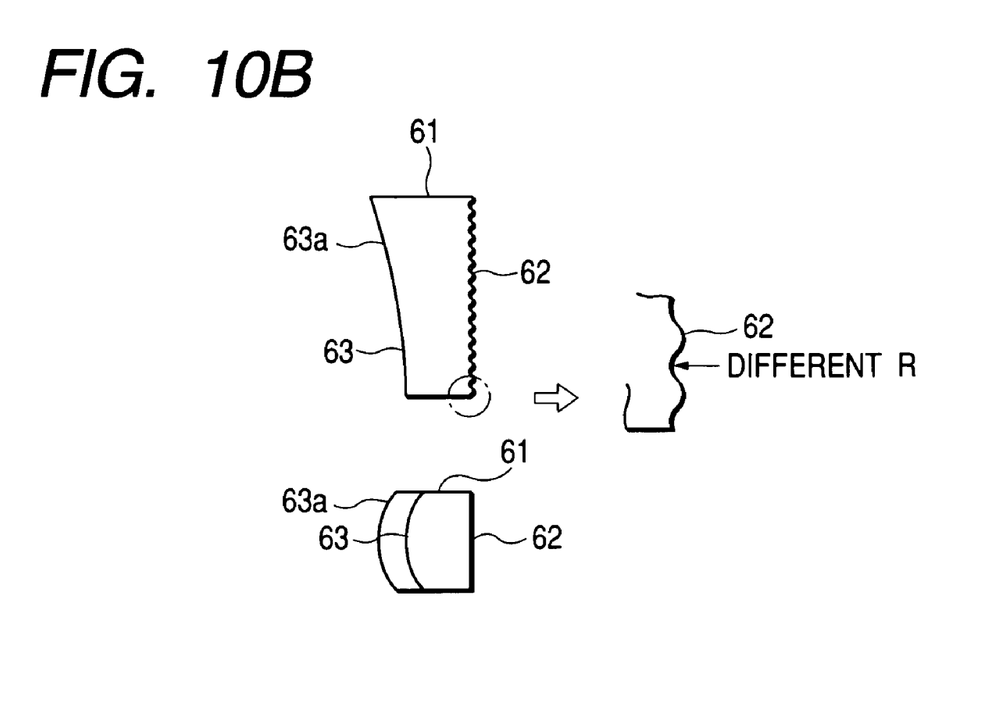
FIG. 10B is an illustration of a configuration of an illumination lens device according to a fifth embodiment of the present invention.

Although in the above-described first embodiment the curved surface portion 26a is formed in the rod-like lens unit surface 26 of the illumination lens device 21 and in the above-described second embodiment the multi-tiered lens unit surface 32 of the illumination lens device 31 is made to have different radii of curvatures R, according to a fourth embodiment of the present invention is, as shown in FIG. 10A, in an illumination lens device 51, all the radii of curvature R of a multi-tiered lens unit surface 52 are made constant, and a rod-like lens unit surface 53 is formed uniformly in horizontal directions. This also can achieve a desired purpose. Alternatively, according to a fifth embodiment of the present invention, as shown in FIG. 10B, in an illumination lens device 61, the radii of curvature R of a multi-tiered lens unit surface 62 are made to stand at different values at its peripheral portion and its central side portion, and a curved surface portion 63a is formed in a rod-like lens unit surface 63. This produces a further variation of the light diffusion range.

In addition, although not shown, it is also appropriate that a diaphragm plate is provided between an illumination light source (LED) and an illumination lens for narrowing down the light from an LED in a vertical direction. This can provide higher-contrast illumination light. Still additionally, although in the above-described embodiments the optical axis of the illumination light and the optical axis O of the light-receiving optical system are positioned on the physically same plane, for example, even in a case in which an optical path is bent by a mirror, if the optical axis of the illumination light immediately before the projection to the object L of reading and the optical axis of the light immediately after reflected from the object L of reading to be image-formed through an image formation lens are placed on the same plane, then it can be considered that they are on the optically same plane.

It should be understood that the present invention is not limited to the above-described embodiments, and that it is intended to cover all changes and modifications of the embodiments of the invention herein which do not constitute departures from the spirit and scope of the invention.

For example, although in the above-described first embodiment the right- and left-side illumination lens devices are integrally connected to each other through a connecting portion, it is also acceptable that separate illumination lens devices are provided on the right- and left-hand portions.

Moreover, the present invention is not limited to the handy-type bar-code reader but it is also applicable to a fixed-type optical information reading apparatus, and various modifications of the constructions of the light-receiving optical system and the guide optical system and the configuration of the case are also acceptable.

What is claimed is:

1. An optical information reading apparatus comprising:
an illumination optical system for projecting illumination light, elongated in a read width direction, onto an object of reading, said illumination optical system including an illumination light source made using an LED and illumination lens means made to output light incident thereon from said illumination light source while condensing and/or diffusing the incident light; and
a light-receiving optical system including a light-receiving sensor for receiving light reflected from said object of reading,
said illumination lens means including a multi-tiered lens unit in which a plurality of concave lens tiers and a plurality of convex lens tiers are alternately disposed in succession in said read width direction and a condensing lens unit for condensing said illumination light in a direction perpendicular to said read width direction, with said multi-tiered lens unit and said condensing lens unit being formed integrally with each other, and
said illumination lens means is made such that a peripheral portion of said illumination lens means and a central side portion of said illumination lens means in said read width direction differ in optical characteristic from each other so that said peripheral portion has a light diffusion range smaller than that of said central side portion,
wherein, in said illumination lens means, said multi-tiered lens unit is made such that a radius of curvature of said peripheral portion of said multi-tiered lens is set to be larger than a radius of curvature of said central side portion thereof configured to make a variation in radius of curvature vary between said peripheral portion and said central side portion for producing the different optical characteristics.

2. The apparatus according to claim 1, wherein, in said illumination lens means, said condensing lens unit is formed to have a curved surface in said read width direction for producing the different optical characteristics.

3. The apparatus according to claim 1, further comprising a guide optical system including a guide light source for emitting laser light and a guide lens for spreading light emitted from said guide light source in said read width direction, and said guide lens is formed integrally with said illumination lens means.

4. The apparatus according to claim 1, wherein two illumination optical systems are used as said illumination optical system and disposed symmetrically with respect to said light-receiving optical system, and said illumination lens means of the symmetrically disposed illumination optical systems are integrally connected to each other through a connection portion which does not function as a lens.

5. The apparatus according to claim 1, wherein the optical axis of said illumination light and the optical axis of said light-receiving optical system are optically disposed on the same plane.

6. The apparatus according to claim 1, wherein each of the illumination optical systems includes a plurality of the illumination light sources.

7. The apparatus according to claim 1, wherein a horizontal illumination range of the illumination light source is wider than a field of view of the light-receiving optical system.

8. The apparatus according to claim 1, further comprising a trigger having first and second stages and in communication with the guide optical system and the illumination optical system, wherein the guide optical system is responsive to a first stage of the trigger, and the illumination optical system is responsive to a second stage of the trigger.

* * * * *